(12) United States Patent
Dorrer et al.

(10) Patent No.: US 7,844,186 B2
(45) Date of Patent: Nov. 30, 2010

(54) METHOD AND APPARATUS FOR OPTICAL TRANSMISSION

(75) Inventors: Christophe J. Dorrer, Matawan, NJ (US); Alan H. Gnauck, Middletown, NJ (US); Inuk Kang, Matawan, NJ (US); Chongjin Xie, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1632 days.

(21) Appl. No.: 10/815,033

(22) Filed: Mar. 31, 2004

(65) Prior Publication Data

US 2005/0185968 A1    Aug. 25, 2005

Related U.S. Application Data

(60) Provisional application No. 60/546,504, filed on Feb. 20, 2004.

(51) Int. Cl.
*H04B 10/04* (2006.01)

(52) U.S. Cl. .................. 398/184; 398/183; 398/185; 398/188; 398/140; 398/152

(58) Field of Classification Search .............. 398/152, 398/182–184, 188, 205; 385/3; 359/161
See application file for complete search history.

(56) References Cited

U.S. PATENT DOCUMENTS

| | | | |
|---|---|---|---|
| 5,008,958 A | 4/1991 | Cimini, Jr. et al. .......... 455/619 |
| 5,111,322 A | 5/1992 | Bergano et al. | |
| 5,184,243 A | 2/1993 | Henmi et al. | |
| 5,247,382 A | 9/1993 | Suzuki et al. | |
| 5,416,628 A * | 5/1995 | Betti et al. ................... 398/185 |
| 5,654,818 A * | 8/1997 | Yao .............................. 359/246 |
| 5,708,734 A * | 1/1998 | Van Der Tol ................. 385/11 |
| 5,757,912 A * | 5/1998 | Blow ............................ 380/256 |
| 5,911,016 A | 6/1999 | Naito | |
| 5,953,421 A * | 9/1999 | Townsend .................... 380/283 |
| 6,476,952 B1 * | 11/2002 | Snawerdt ..................... 398/141 |
| 6,480,552 B1 * | 11/2002 | Tonello ........................ 375/265 |
| 6,650,846 B1 * | 11/2003 | Ito ............................... 398/184 |

(Continued)

FOREIGN PATENT DOCUMENTS

EP    1 026 840 A1    8/2000

(Continued)

OTHER PUBLICATIONS

Hodzic et al: "Improvement of System Performance in N x 40-Gb/s WDM Transmission Using Alternate Polarizations", IEEE Photonics Techmology Letters, vol. 15, No. 1, Jan. 2003, pp. 153-155.*

(Continued)

*Primary Examiner*—Li Liu
(74) *Attorney, Agent, or Firm*—Wall & Tong, LLP

(57) ABSTRACT

Methods and apparatus are provided for transmitting alternate-polarization phase-shift-keyed data. The output of a laser is modulated to optically encode electronic data using phase shift keying (PSK) to generate an optical signal. An alternate polarization PSK (APol-PSK) signal is generated by alternating the polarization of the optical signal using a modulator such that successive optical bits have substantially orthogonal polarizations.

18 Claims, 6 Drawing Sheets

A

B

U.S. PATENT DOCUMENTS

| | | | | |
|---|---|---|---|---|
| 6,842,287 | B2* | 1/2005 | Munks et al. | 359/579 |
| 7,024,123 | B2* | 4/2006 | Yano | 398/184 |
| 7,116,917 | B2* | 10/2006 | Miyamoto et al. | 398/185 |
| 7,272,271 | B2* | 9/2007 | Kaplan et al. | 385/3 |
| 2002/0093713 | A1* | 7/2002 | Snawerdt | 359/173 |
| 2003/0002121 | A1* | 1/2003 | Miyamoto et al. | 359/183 |
| 2003/0007216 | A1* | 1/2003 | Chraplyvy et al. | 359/161 |
| 2003/0090768 | A1* | 5/2003 | Liu et al. | 359/183 |
| 2003/0118350 | A1* | 6/2003 | Bergano | 398/183 |
| 2003/0161638 | A1* | 8/2003 | Fujiwara et al. | 398/184 |
| 2003/0215173 | A1* | 11/2003 | Hakimi et al. | 385/15 |
| 2004/0165808 | A1* | 8/2004 | Lauzon | 385/11 |
| 2004/0227649 | A1* | 11/2004 | Mauro et al. | 341/69 |
| 2004/0252929 | A1* | 12/2004 | Kim et al. | 385/1 |
| 2005/0100347 | A1* | 5/2005 | Yano | 398/188 |

FOREIGN PATENT DOCUMENTS

| | | |
|---|---|---|
| JP | H04-117036 | 4/1992 |
| JP | 2828369 | 6/1993 |
| JP | H10-206661 | 8/1998 |
| JP | 2003-021816 | 1/2003 |
| JP | 2003-087201 | 3/2003 |

OTHER PUBLICATIONS

Heismann et al: "High-Speed Polarization Scrambler with Adjustable Phase Chirp", IEEE Journal of Selected Topic in Quantum Electronics, vol. 2, No. 2, Jun. 1996, p. 311-318.*

Franco et al: "10 Gbit/s alternate polarization soliton transmission over 300km step-index fibre link with no in-line control", ECOC'98, Sep. 20-24, 1998, pp. 95-96.*

Bergano et al: "Bit-synchronous polarization and phase modulation scheme for improving the performance of optical amplifier transmission systems", Electronics Letters, Jan. 4, 1996, vol. 32, No. 1, pp. 52-54.*

Xie et al: "Suppression of Intrachannel Nonlinear Effects With Alternate-Polarization Format", Journal of Lightwave Technology, vol. 22, No. 3, Mar. 2004, pp. 806-812.*

S. Benedetto et al., "Direct Detection Of Optical Digital Transmission Based On Polarization Shift Keying Modulation", *IEEE Journal On Selected Areas In Communications,* vol. 13, No. 3, Apr. 1995, pp. 531-542.

A. H. Gnauck et al., "6 x 42.7-Gb/s Transmission Over Ten 200-km EDFA-Amplified SSMF Spans Using Polarization-Alternating RZ-DPSK" *Proc. of the Optical Fiber Conference,* Feb. 25, 2004.

Examiner's Official Letter dated Feb. 13, 2009 in JP Patent Application No. 2005-041475, Lucent Technologies Inc., Applicant, 3 pages.

* cited by examiner

| D= $V_2/V_\pi$ | 0 | 0 | 1 | 0 | 0 | 1 | 0 | 0 |
|---|---|---|---|---|---|---|---|---|
| 20G CLK | 0 | 1 | 0 | 1 | 0 | 1 | 0 | 1 |
| D⊕CLK=$V_1/V_\pi$ | 0 | 1 | 1 | 1 | 0 | 0 | 0 | 1 |

METHOD AND APPARATUS FOR OPTICAL TRANSMISSION

CROSS REFERENCE TO RELATED APPLICATIONS

This application claims priority of Provisional Application Ser. No. 60/546,504 which was filed Feb. 20, 2004.

FIELD OF THE INVENTION

The present invention generally relates to the field of optical communications, and more particularly to optical communication apparatus for generating alternate-polarization phase-shift-keyed optical signals.

BACKGROUND OF THE INVENTION

In highly dispersed pseudo-linear high bit-rate long-haul transmission systems, intra-channel four-wave mixing (IFWM) and intra-channel cross-phase modulation (IXPM) are the main causes for nonlinear penalties. Using a Differential-phase-shift-keying (DPSK) modulation format can mitigate these penalties as compared to on-off-keying (OOK). Several 40-Gb/s DPSK ultra-long-haul DWDM transmission experiments have shown excellent capacity and distance performance. The strong resistance of DPSK against IXPM stems from the equal pulse energy in each time slot. It has also been shown that the reduced pulse energy of Return-to-Zero (RZ)-DPSK compared to RZ-OOK and a correlation between the nonlinear phase shifts of two adjacent pulses contribute to the better robustness of RZ-DPSK against IFWM.

In principle, alternating the polarization of the signal from bit to bit will further reduce the nonlinear penalties since there is little FWM between two orthogonally polarized signals and the effect of XPM between the two orthogonal polarizations is half that between the parallel ones. Prior art simulations have shown that more than 50% improvement in the transmission distance can be achieved by using Alternate Polarization-DPSK (APol-DPSK) compared to single polarization DPSK. The simultaneous application of DPSK and polarization alternation enhances the performance in an optical transport system where the intra-channel optical nonlinear interactions are limiting factors.

One prior art method for implementing alternate-polarization DPSK uses optical-time-division-multiplexing (OTDM) and polarization-multiplexing in the transmitter. The method requires a short-pulse source operating at half bit rate, OTDM demultiplexing or polarization demultiplexing at receiver, and complicated transmitters and receivers. Such a method is not practical in real system applications and is not suitable for Non-Return-to-Zero (NRZ) formats. This approaches is also impractical for optical networks because it requires multiple optical transmitters for a single channel.

Moreover, prior art methods of DPSK data precoding and encoding are not suitable for efficiently generating alternate polarization formatted signals.

SUMMARY OF THE INVENTION

These and other deficiencies of the prior art are addressed by embodiments of the present invention that include methods and apparatus for generating and/or transmitting Alternate Polarization-DPSK (APol-DPSK) optical signals, where information is optically encoded between optical bits of an optical signal temporally separated by an even number of bit periods. The present invention can be applied to DPSK and PSK formats, including but not limited to, Differential-Quadrature-Phase-Shift-Keying (DQPSK), Differential-$\pi$/2-Phase-Shift-Keying (D-$\pi$/2-PSK), and the like.

In one embodiment, a method of APol-PSK transmission is provided which includes modulating the output of an optical source to optically encode electronic data using phase shift keying (PSK) to generate an optical signal, and alternating the polarization of the phase shift keyed optical signal using a modulator such that successive optical bits have substantially orthogonal polarizations to generate an APol-PSK signal.

In another embodiment, a method of APol-DPSK transmission is provided which includes precoding an electronic data signal, modulating the output of a laser using the precoded electronic data signal, and differential phase shift keying between two optical bits separated by an even number of bit periods to generate an optical signal. The polarization of the differentially phase shift keyed optical signal is alternated using a modulator such that successive optical bits have substantially orthogonal polarizations to generate an APol-DPSK signal.

In another embodiment an optical transmitter for APol-DPSK transmission is provided comprising an optical source, and a precoder device for precoding an electronic data signal. An optical phase-shift-keying data modulator is driven by a precoded electronic data signal from the precoder device to produce an optical DPSK signal such that the signal is carried as phase shift keying between two optical bits separated by an even number of bit periods. A polarization alternator is optically coupled to the data modulator to provide polarization alternation of the output of the data modulator.

In another embodiment, an optical transmitter for APol-DPSK transmission is provided comprising an optical source, a precoder device for precoding an electronic data signal, and a modified Mach-Zehnder (MZ) modulator having a polarization rotation device in at least one arm. Drive circuitry for the MZ modulator is provided to process the precoder output and to simultaneously achieve polarization alternation and optical data encoding as phase shift keying between the two optical bits separated by an even number of bit periods.

BRIEF DESCRIPTION OF THE DRAWINGS

The foregoing and other objects, features and advantages of the present invention will become more apparent from the following detailed description when taken in conjunction with the appended drawings.

It is to be noted, however, that the appended drawings illustrate only exemplary embodiments of the invention and are therefore not to be considered limiting of the scope of the invention.

FIGS. 4 A-C are drawings illustrating alternate embodiments of polarization alternating modulators that may be used in accordance with the present invention;

DETAILED DESCRIPTION

Although the present invention is discussed below with reference to two-bit delay implementations of APol-DPSK, it can be understood by those skilled in art that straightforward modifications allow implementing APol-DPSK for other even-bit delay cases. It is also understood that the present invention can be applied to accomplish polarization alternation with other phase-shift-keying formats, including but not limited to DQPSK, PSK (non-differential) and D-$\pi$/2-PSK.

Figure 1:
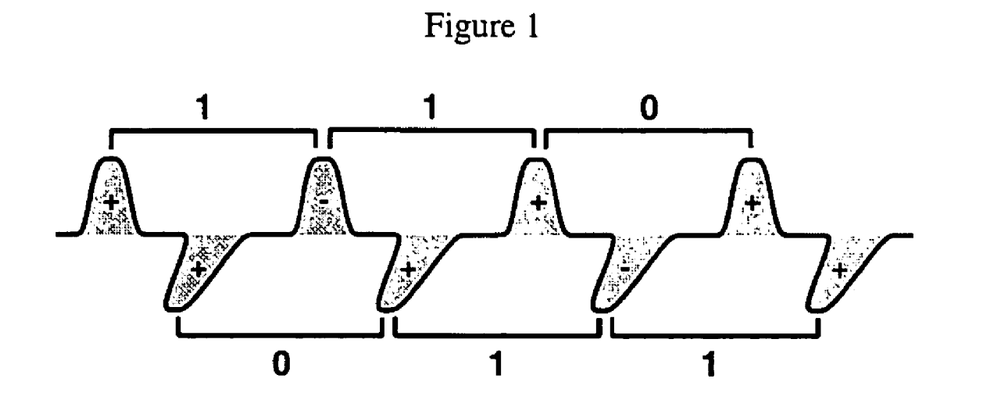
FIG. 1 is an illustration of an RZ-APol-DPSK formatted data stream encoded with '101101'.

APol-DPSK data encoding: In conventional optical DPSK transmission, information is encoded by 0-or $\pi$-phase shifting between successive bits. In accordance with the present invention this strategy is modified so alternate polarization may be used with DPSK (since successive bits have orthogonal polarizations, they do not interfere in a conventional DPSK demodulator that uses a one-bit delay line interferometer). The encoding for APol-DPSK may be accomplished by differentially phase shift keying between any two bits separated by an even number of bit slots (having the same polarization). Two-bit delay is the shortest possible and is preferred owing to the consequent simplicity of the implementation and to the increased polarization and phase correlation between the two bits. The phase and polarization information of two-bit delay APol-DPSK is illustrated in FIG. 1. The demodulation of the signal can then be achieved using, for example, an even bit delay-line interferometer.

Figure 2:
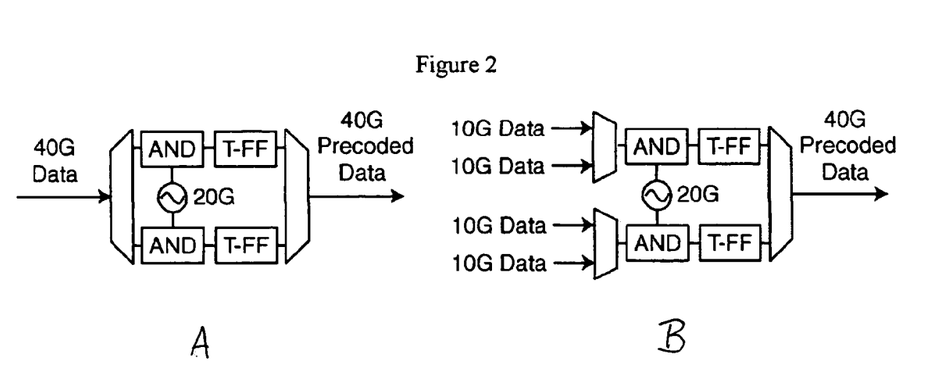
FIG. 2A is a diagram showing a 40-Gb/s APol-DPSK precoder that can be used in accordance with embodiments of the invention.
FIG. 2B is a diagram showing a 40-Gb/s APol-DPSK precoder integrated with a 10-Gb/s to 40-Gb/s electronic time-division multiplexer that can be used in accordance with embodiments of the invention.

APol-DPSK preceding: A precoder, such as those shown in FIGS. 2 A-B, is preferably used in systems for generating APol-DPSK optical signals according to the present invention. The role of the precoder is to process the input data in such a manner that the output of the precoder may be optically encoded as the phase-shift-keying between two optical bits separated by an even number of bit periods.

The precoders shown in FIGS. 2A-B utilize the fact that a stream of Apol-DPSK formatted data can be logically split into two independent sets of orthogonal polarizations, where each set is, for example, a conventional 20 Gb/s DPSK. It is to be noted that the AND and Toggle Flip-Flop (T-FF) elements in FIGS. 2 A-B need only to operate at half the bit rate (e.g. 20 Gb/s), in contrast to the comparable elements in a conventional (e.g. 40-Gb/s) DPSK precoder.

In practice, a 40-Gb/s data stream can be electronically multiplexed out of lower bit-rate tributaries, and the precoder can be integrated in the multiplexing process, as depicted in FIG. 2B for the case of electronic time-division multiplexing (ETDM) of four 10-Gb/s data streams.

Figure 3:
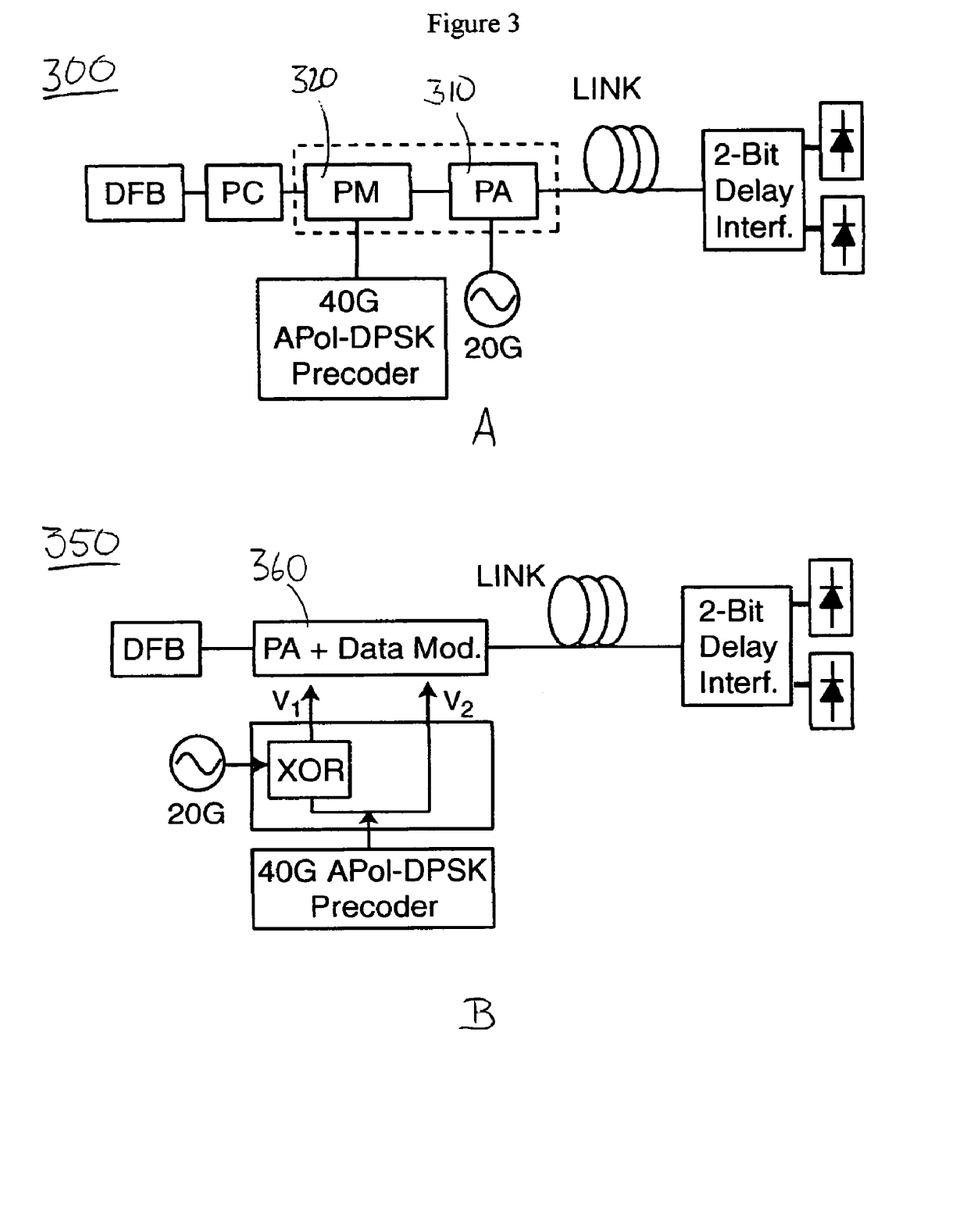
FIG. 3A shows an embodiment of an RZ-APol-DPSK transmission apparatus using a DFB: distributed feedback laser, PC: RZ pulse carver, PM: phase modulator, PA: polarization alternator in accordance with aspects of the invention.
FIG. 3B shows an embodiment of an APol-DPSK transmission apparatus using a single modulator for simultaneous data modulation and polarization alternation.

APol-DPSK optical modulation: The optical modulation and transmission of the precoded electronic data for APol-DPSK according to the invention can be achieved by, for example, the implementations shown in FIGS. 3 A-B. FIG. 3A depicts an optical transmission system 300 according to one embodiment of the invention where a polarization alternator (PA) 310 is used for alternating the polarizations of a modulated optical signal from a phase-shift-keying data modulator (PM) 320. The phase-shift-keying data modulator can be, for example, either a phase modulator, or a Mach-Zehnder modulator.

Figure 4:
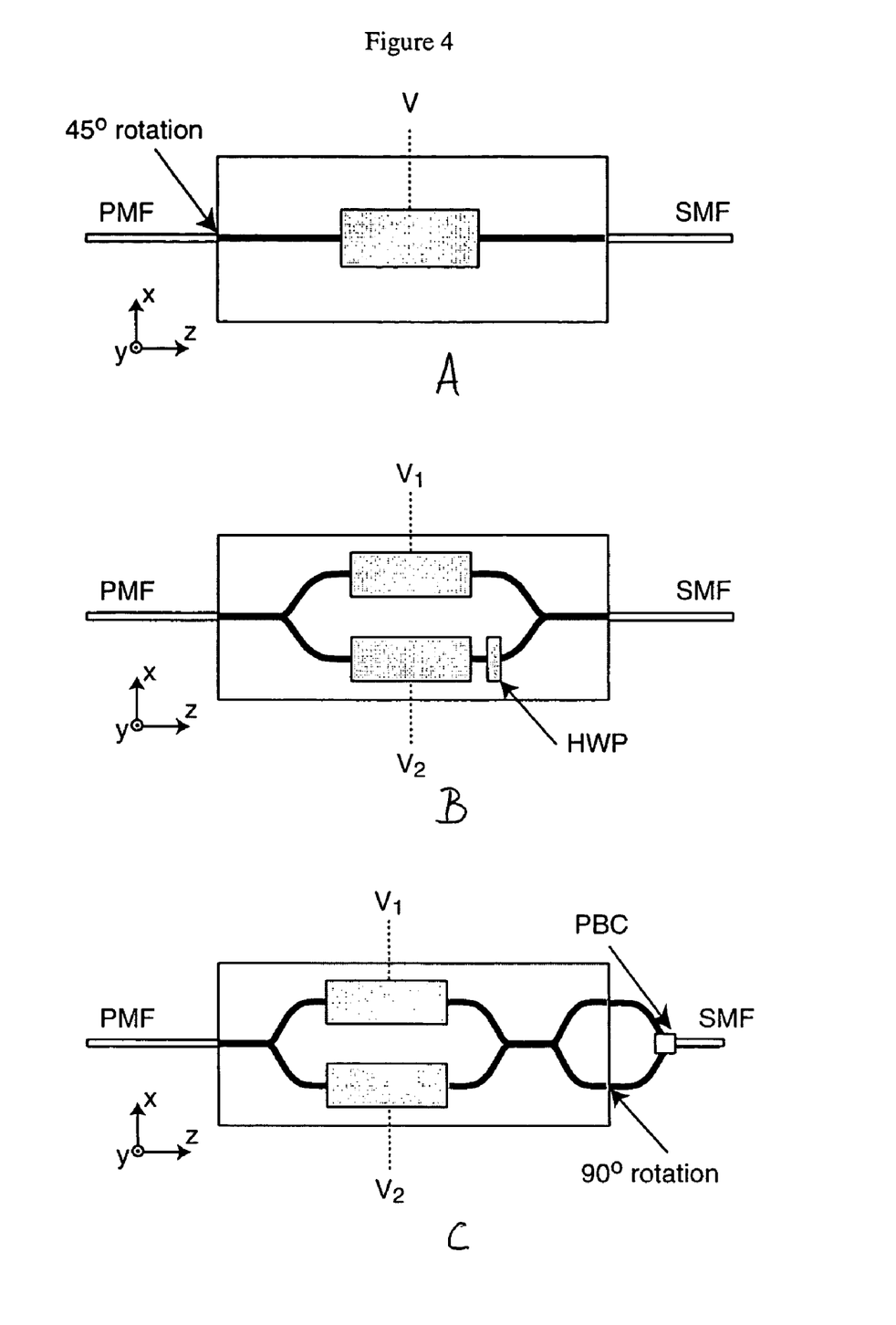

Several designs of PAs 310 are possible. One example of such a PA is a phase modulator (shown in FIG. 4A). The operational principle of the PA of FIG. 4A is similar to that of an electrooptic polarization scrambler. When an optical signal is launched into the modulator with its polarization oriented at 45 degrees with respect to the crystal axis, the output polarization is $\hat{x}\exp(jrV(t))+\hat{y}$, where r is the difference between the TE and TM electrooptic coefficients and V(t) is the voltage applied to the phase modulator. The drive voltage is preferably a sine wave or square wave with the repetition rate half of the bit rate and the peak-to-peak amplitude of the voltage should produce $\pi$ phase difference between the TE and TM polarization components, thereby producing polarization alternation from bit to bit. Note that the data modulator and polarization alternator can be easily integrated into a single device as noted by the dotted box in FIG. 3A. In this case, an integrated wave plate can be inserted between the two modulator sections in order to rotate the polarization of the output of the data modulator section by 45 degrees. If there exists a substantial difference between the propagation velocities of TE and TM modes in the polarization alternator, a birefringent element may be inserted to compensate for the difference.

FIG. 4B illustrates a modified Mach-Zehnder modulator device having a polarization rotation component, for example a half-wave plate, integrated in one arm to provide rotation of the polarization of the light in the arm by 90 degrees. The light outputs from the two arms are combined by a polarization combining or 3-dB power combining coupler junction. Such a device can be driven in a similar manner to the device in FIG. 4A to achieve polarization alternation. The difference of the drive voltages applied to the two arms of the modulator is preferably a sine wave or square wave with the repetition rate half of the bit rate, and the amplitude of the difference voltage is set to $V_\pi$ of the modulator.

FIG. 4C illustrates a Mach-Zehnder modulator device having two complementary output ports. A polarization beam combiner (PBC) is also provided for combining signals from the two output ports. Such a device can be driven in a similar manner to the device in FIG. 4B to achieve polarization alternation.

FIG. 3B shows an optical transmission system 350 according to another embodiment of the invention in which the polarization alternation and the data modulation are accomplished in a single optical modulator 360, as shown in FIG. 4B. A modified Mach-Zehnder modulator is preferably used, where the polarization of the field in one arm is rotated by 90 degrees. Assuming that the input field is polarized along $\hat{x}$, the field in the upper arm of the interferometer in FIG. 4B is $\hat{x}\exp(j\pi V_1(t)/V_\pi)$ while the field in the lower arm is $\hat{y}\exp(j\pi V_2(t)/V_\pi)$ after the polarization rotation. Those skilled in the art will appreciate that these fields can be recombined by, for example, a polarization combining coupler junction or a 3-dB power combining coupler junction.

It will be apparent to those skilled in the art that other ways of providing the polarization rotation in one arm of the interferometer as well as other way of recombining the two arms would lead to substantially identical operation. Additionally, it should be apparent that other ways of modifying the state of polarization of the two arms of the interferometer would be suitable as long as they provide substantially orthogonal states of polarization before recombination.

Figure 5:
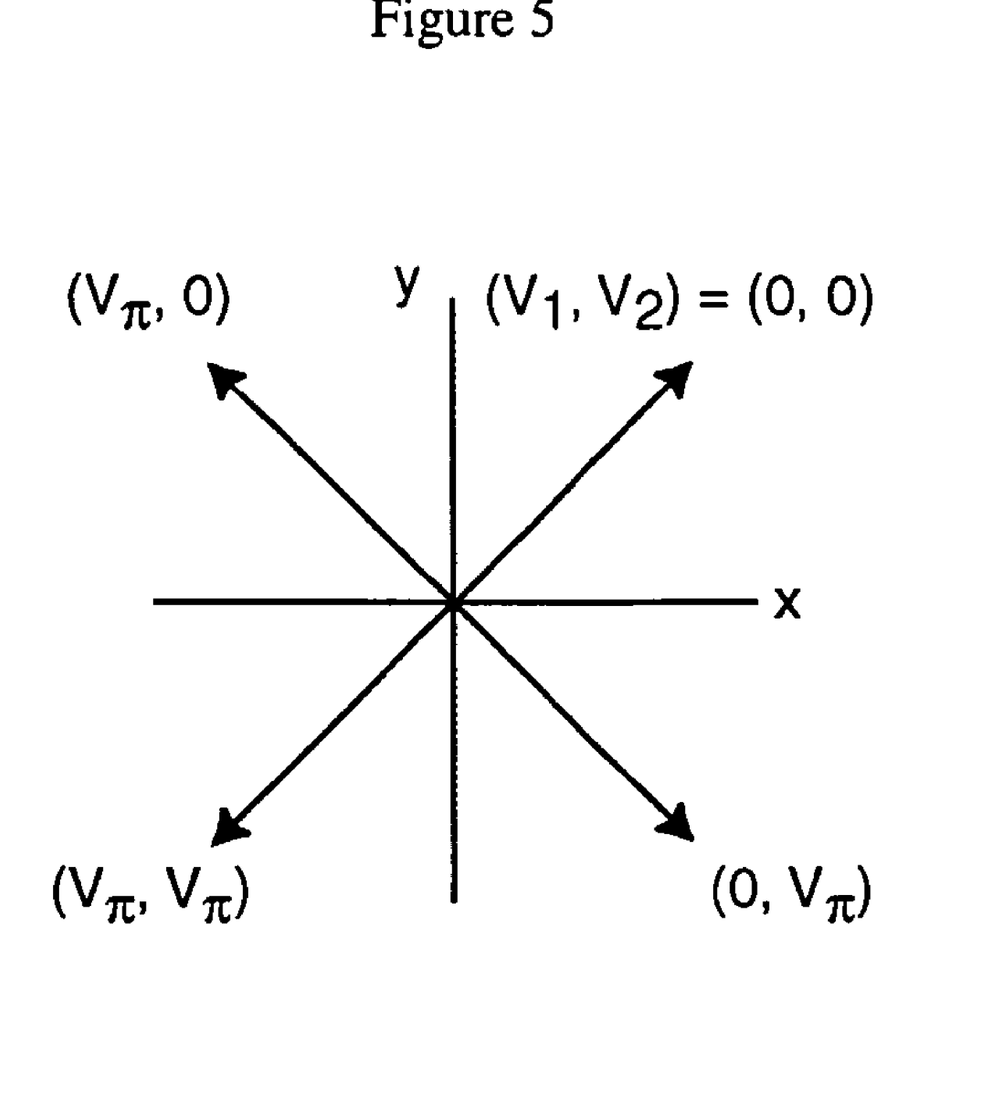
FIG. 5 is a plot which illustrates orientations of the electric field of light output of the device shown in FIG. 4 B as a function of the drive voltages.
Figure 6:
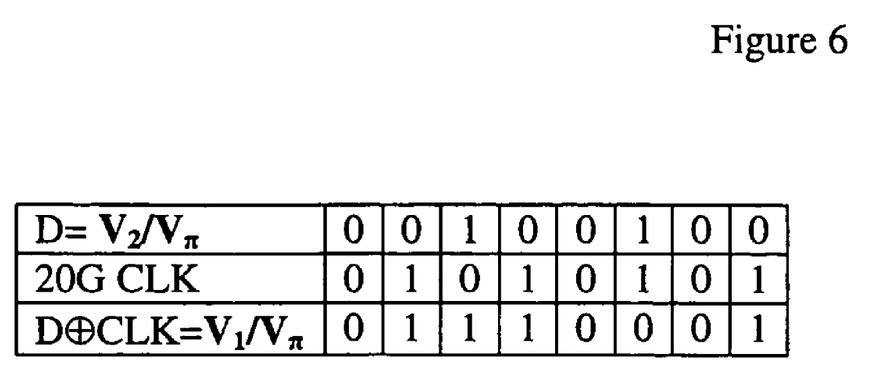
FIG. 6 is a logic table showing the relations among an APol-DPSK precoded bit stream D for the data '101101', a 20 G Clock (CLK), and a phase section drive voltages for the device in FIG. 4 B.

The orientations of the electric field vector for the output of the modulator 360 can be written as $\hat{x}\exp(j\pi V_1/V_\pi)+\hat{y}\exp(j\pi V_2/V_\pi)$, and are illustrated in FIG. 5 for four combinations of the voltages applied to the two electrodes of the modulator 360. It can be understood from FIG. 1 and FIG. 5 that the sequence of the pairs of voltages $V_1$ and $V_2$ in the table of FIG. 6 yields the APol-DPSK encoded bit stream for '101101' shown in FIG. 1. Moreover, the voltages $V_1$ and $V_2$ are simply related to the precoded data (D) and 20 G clock, namely $V_1/V_\pi = D \oplus CLK$, and $V_2/V_\pi = D$, where $\oplus$ denotes XOR operation.

In order to demonstrate aspects of the present invention and the performance improvement of APol-DPSK over DPSK, a single-channel 42.7-Gb/s transmission experiment was performed using an implementation similar to that shown in FIG. 3A. A 1551-nm laser and pulse carver produced 8-ps optical pulses, which were then DPSK-modulated using a Mach-Zehnder modulator. Data precoding was not necessary, since a pseudo-random data sequence (length $2^{31}-1$, electronically multiplexed from four copies of a 10.7-Gb/s sequence with quarter-pattern delays) was used. The 330-km fiber link consisted of four ~82-km spans of standard single-mode fiber (SSMF), each followed by dispersion-compensating fiber (DCF). A Raman+Erbium hybrid amplification scheme was used in each span. The launched power in each span was +7 dBm. The received optical signal-to-noise ratio was set to 22.2 dB (measured in a 1-nm resolution bandwidth and referred to 0.1 nm). A 4-bit (93.7-ps) delay interferometer was used as the demodulator. This was followed by single-photodiode detection, clock recovery, and electronic demultiplexing to 10.7 Gb/s for bit-error-rate (BER) testing. Without alternating the polarization, the BER was $10^{-6}$. A sinusoidally driven polarization alternator was then added to the transmitter, and the BER improved to $10^{-9}$.

An additional demonstration of aspects of the invention was performed and is discussed in A. H. Gnauck et al., Paper PDP 35, "6×42.7-Gb/s transmission over ten 200-km EDFA-amplified SSMF spans using polarization-alternating RZ-DPSK", OFC 2004, Feb. 22-27, 2004, which is incorporated herein.

Although the invention has been described with reference to illustrative embodiments, this description should not be construed in a limiting sense. Various modifications of the described embodiments, as well as other embodiments of the invention, which are apparent to persons skilled in the art to which the invention pertains, are deemed to lie within the principle and scope of the invention.

Although the steps of various methods according to the invention are disclosed and discussed with reference to a particular sequence, the present invention is not limited to methods implementing some or all of those steps in those particular sequences.

We claim:

1. A method for APol-DPSK transmission comprising:
   modulating an input optical signal according to a precoded electronic data signal by differential phase shift keying between two optical bits separated by an even number of bit periods to generate an encoded optical signal;
   alternating the polarization of the encoded optical signal using a modulator such that successive optical bits have substantially orthogonal polarizations to generate an APol-DPSK signal; and
   demodulating the APol-DPSK signal using an even bit delay line interferometer.

2. The method of claim 1 wherein the modulation is performed by a phase modulator driven by a sinusoidal RF voltage.

3. The method of claim 1 wherein the modulation is performed by a phase modulator driven by a train of square pulses.

4. The method of claim 1 wherein the input optical signal is provided having a polarization oriented at a predetermined angle such that the polarization of successive optical bits of the transmitted APol-DPSK signal are substantially orthogonal.

5. The method of claim 1 wherein the modulation is performed by a Mach-Zehnder modulator including a polarization rotation device in at least one arm.

6. The method of claim 5 wherein the polarization rotation device is a half-wave plate.

7. The method of claim 5 wherein at least one arm of the Mach-Zehnder modulator is driven by a sinusoidal RF voltage.

8. The method of claim 5 wherein at least one arm of the Mach-Zehnder modulator is driven by a train of square pulses running at half the bit rate.

9. A method of APol-DPSK transmission comprising:
   modulating an optical signal according to a precoded electronic data signal by differential phase shift keying between two optical bits separated by an even number of bit periods and performing polarization alternating such that successive optical bits have substantially orthogonal polarizations to generate an APol-DPSK signal;
   wherein said modulating and said polarization alternating are performed simultaneously by a Mach-Zehnder modulator including a polarization rotation device in at least one arm, and
   wherein input signals to both arms of the Mach-Zehnder modulator have polarizations that are the same.

10. The method of claim 9 wherein the polarization rotation device is a half-wave plate.

11. The method of claim 9 further comprising demodulating the APol-DPSK signal using an even bit delay line interferometer.

12. An optical transmitter for APol-DPSK transmission comprising:
   a Mach-Zehnder (MZ) modulator having a half-wave plate in one arm, wherein input optical signals to both arms of the Mach-Zehnder modulator have polarizations that are the same; and
   drive circuitry, coupled to the MZ modulator for driving the MZ modulator using a precoded data signal to simultaneously provide polarization alternation and optical data encoding of an optical signal received by the MZ modulator using differential phase shift keying between two optical bits separated by an even number of bit periods to generate an APol-DPSK signal.

13. The transmitter of claim 12 wherein at least one arm of the Mach-Zehnder modulator is driven by a sinusoidal RF voltage.

14. The transmitter of claim 12 wherein at least one arm of the Mach-Zehnder modulator is driven by a train of square pulses running at half the bit rate.

15. The transmitter of claim 12 wherein the Mach-Zehnder modulator comprises two complementary output ports, and wherein the transmitter further comprises a polarization beam combiner for combining outputs from the two output ports of the Mach-Zehnder modulator.

16. The transmitter of claim 12 wherein at least one arm of the Mach-Zehnder modulator is driven by a sinusoidal RF voltage.

17. The transmitter of claim 12 wherein at least one arm of the Mach-Zehnder modulator is driven by a train of square pulses running at half the bit rate.

18. An optical transmission system for APol-DPSK transmission comprising:
- an optical phase-shift-keying (PSK) data modulator driven by a precoded electronic data signal to produce an optical DPSK signal, wherein the electronic data to be transmitted is optically encoded by the PSK data modulator as differential phase shift keying between two optical bits separated by an even number of bit periods;
- a polarization alternator, optically coupled to the data modulator, to provide polarization alternation to the optical DPSK signal to produce an APol-DPSK signal; and
- a demodulator, comprising an even bit delay line interferometer.

* * * * *